United States Patent Office 2,980,615
Patented Apr. 18, 1961

2,980,615

LUBRICANTS THICKENED WITH METAL SALTS OF HALF ESTERS OF SUBSTITUTED DICARBOXYLIC ACIDS

Arnold J. Morway, Clark, and Jeffrey H. Bartlett, New Providence, N.J., assignors to Esso Research and Engineering Company, a corporation of Delaware No Drawing. Filed Mar. 20, 1959, Ser. No. 800,633

5 Claims. (Cl. 252—41)

This invention relates to grease compositions thickened with the metal salt of a half ester of: an alkenyl succinic acid or an alkenyl methyl succinic acid.

This application is a continuation-in-part of application, Serial No. 448,364, filed August 6, 1954, now U.S. Patent No. 2,929,785.

The thickener of the invention is prepared by first esterifying the alkenyl succinic acid or the alkenyl methyl succinic acid, or anhydrides thereof, to form a half ester and then neutralizing the remaining carboxylic group of the half ester to obtain the salt thickener.

The alkenyl substituted succinic acids and their manufacture are known in the art, e.g. see U.S. 2,133,734 issued to Moser. These materials are generally prepared by condensing maleic anhydride with an olefin. By condensing the olefin with citraconic acid or with itaconic acid the resulting product is an alkenyl methyl succinic acid. For purposes of the present invention those alkenyl succinic and methyl succinic acids having 8 to 22, preferably 8 to 18 carbon atoms in the alkenyl group may be used. The alkenyl group may be branched or straight chain and can be derived from an olefin, preferably a monoolefin, in which the olefinic linkage can be at the terminal position or towards or in the middle of the molecule. A commercial hexadecenyl succinic anhydride prepared by treating hexadecene-1 with maleic anhydride was used in several of the examples of the invention.

The alkenyl succinic acid material is esterified with a $C_8$ to $C_{18}$ alcohol in order to form the half ester. This esterification is carried out by conventional techniques by mixing the reactants, with or without an esterification catalyst, heating to reflux and removing the water evolved overhead. A water entrainer such as toluene may be used if desired. The aliphatic saturated alcohols which can be used may be straight or branched chain such as octanol, isooctanol, decanol, lauryl alcohol, tetradecanol, etc. One source of inexpensive alcohols which can be used to advantage are the Oxo alcohols. These Oxo alcohols constitute isomeric mixtures of highly branched chain primary alcohols. They are produced by the Oxo process which involves the reaction of an olefin with carbon monoxide and oxygen in the presence of a cobalt carbonyl catalyst at elevated temperatures and pressures to form aldehydes. The resulting aldehydes are then catalytically hydrogenated to form the alcohols. Oxo alcohols are well known in the art and their preparation and characteristics have been described in numerous patents.

After the half ester is prepared, it is then converted to a metal salt by reaction with an alkali metal base, e.g. carbonates, oxides and hydroxides of potassium, sodium and lithium. The neutralization is preferably carried out in situ in the lubricating oil. Thus, the half ester may be dispersed in the lubricating oil and then neutralized by adding the alkali metal base, followed by heating sufficiently to complete the reaction and to form a dehydrated grease. Generally, the reaction mixture will be heated to about 250° F. to 600° F.

The grease compositions of the invention comprise a major amount of lubricating oil and about 5 to 40, preferably 5 to 25 weight percent of thickener. If desired, the metal salt of the half ester may be used as a sole thickening agent, or it may be advantageously used to supplement other thickeners such as the soaps of $C_{12}$ to $C_{30}$, e.g. $C_{14}$ to $C_{22}$, fatty acids. The metal salt of the half ester may also be used as a component of mixed-salt or soap-salt type thickeners. For example, high molecular weight $C_{12}$ to $C_{30}$ fatty acids such as hydrogenated fish oil acids, naturally occurring acids of animal or vegetable origin, stearic acid, hydroxystearic acids such as 12-hydroxy stearic, dihydroxy stearic, poly-hydroxy stearic, and arachidic acid, tallow acids, etc., may be mixed with the lubricating oil and the half ester previously described, and the mixture coneutralized followed by heating to dehydration. The soaps of these conventional high molecular weight acids may be used in amounts ranging from about 2 to 30 wt. percent, preferably about 5 to 15 wt. percent, based on the finished grease product. Also, salts of low molecular weight $C_2$ to $C_4$ fatty acids, particularly acetic acid, can be used in proportions of about 1 to 10 wt. percent, preferably about 2 to 6 weight percent, based on the finished product. These low molecular weight acids can also be coneutralized with either the half ester or a mixture of the half ester and a $C_{12}$ to $C_{30}$ fatty acid. By heating to temperatures of 400° to 600° F., preferably 430° to 550° F., the mixed salts may be complexed and a greater thickening effect obtained. When used with soaps or salts as outlined above, preferably the salt of the half ester comprises about 30 to 50 wt. percent of the total grease thickener or about 2 to 25 wt. percent of the finished grease.

Other conventional thickeners, anti-oxidants, corrosion inhibitors, tackiness agents, load-carrying compounds, viscosity index improvers, oiliness agents, and the like may be added prior, during or after the grease-making process described above as will be apparent to those skilled in the art.

The base oil of the grease may be either a mineral lubricating oil or a synthetic lubricating oil such as diesters, complex esters, polyglycols, silicones, etc.

The invention will be further understood by reference to the following example:

EXAMPLE I

*Preparation of $C_{13}$ Oxo alcohol half ester of $C_{16}$ alkenyl succinic acid*

A 1-liter flask was charged with 120 g. of $C_{13}$ Oxo alcohol (prepared by subjecting tetrapropylene to the Oxo process) and 193 g. of commercial hexadecenyl succinic anhydride (a co-dimer prepared by treating hexadecene with maleic anhydride). The mixture was heated on a steam bath for 2.5 hours, during which time the temperature rose to 102° C. The resultant half ester, i.e. monoester, was used in the preparation of the lubricating grease described below:

FORMULATION (WT. PERCENT)

| Ingredients | Percent |
|---|---|
| Hydrofol Acids 51 [1] | 10.00 |
| Half ester of hexadecenyl succinic acid | 10.00 |
| Acetic Acid (Glacial) | 4.00 |
| Sodium Hydroxide | 6.00 |
| Phenyl α-naphthylamine | 1.00 |
| Mineral Lubricating Oil [2] | 69.00 |

[1] Hydrogenated fish oil acids corresponding to commercial stearic acid in degree of saturation and average chain length.
[2] Blend of naphthenic type mineral oils having a viscosity of 50 S.S.U. at 210° F.

PREPARATION

The Hydrofol Acids 51, the half ester of hexadecenyl succinic acid and lubricating oil were charged to a fire heated grease kettle and the charge was warmed to about 130° F. The acetic acid was then added, followed immediately by a 40% aqueous solution of the sodium hydroxide. Heating was continued until the composition was dehydrated at about 300° F., after which the temperature was raised to about 500° F. for a period of about 1.25 hours. Thereafter the composition was cooled with agitation to about 250° F. and the phenyl α-naphthylamine was added. The composition was then cooled to about 200° F., and the grease was homogenized in a Gaulin homogenizer.

PROPERTIES

Percent free alkalinity as NaOH _____ 0.38
Penetrations 77° F., mm./10:
    Unworked _____ 290
    Worked, 60 strokes _____ 290
    Worked, 100,000 strokes _____ 300
Dropping point, ° F. _____ 475+
Water washing test (percent loss) _____ 5.0
Norma Hoffmann oxidation, hours to stated drop in pressure:
    220 hours—no drop.
    470 hours to 5 p.s.i. drop.

While the preceding example has illustrated the use of the salt of the half ester in combination with soap and salt of fatty acids, the half ester salt may be used as a sole thickener. For example, a grease may be prepared by dispersing 20 parts by weight of the half ester of Example I and 69 parts by weight of the lubricating oil of Example I, and then adding sodium hydroxide in the form of a 40% aqueous solution, sufficient to neutralize the acid, followed by heating to dehydration at a temperature of about 300° F. The composition may then be cooled to about 250° F., and 1 part by weight of phenyl α-naphthylamine added as an oxidation inhibitor before cooling to room temperature.

To further illustrate the invention, Example I may be repeated but using the half ester of hexadecenyl methyl succinic acid instead of the half ester of hexadecenyl succinic acid.

Examples of other salts of the half ester which can be used include: lithium salt of the n-octyl monoester of hexadecenyl succinic acid, sodium salt of the lauryl monoester of octanyl methyl succinic acid, sodium salt of the $C_{13}$ Oxo monoester of isooctanyl succinic acid, etc.

What is claimed is:

1. A lubricating grease composition comprising lubricating oil and about 5 to 40 weight percent of the alkali metal salt of a half ester prepared from a $C_8$ to $C_{18}$ aliphatic saturated alcohol and a material selected from the group consisting of alkenyl succinic acid and alkenyl methyl succinic acid, wherein said alkenyl groups contain 8 to 22 carbon atoms.

2. A lubricating oil composition comprising a major amount of a mineral lubricating oil and about 5 to 40 weight percent of the sodium salt of a half ester of a $C_8$ to $C_{18}$ aliphatic saturated alcohol and an alkenyl succinic acid, wherein said alkenyl group contains 8 to 18 carbon atoms.

3. A lubricating oil composition comprising a major amount of a mineral lubricating oil and about 5 to 25 weight percent of the sodium salt of a half ester prepared from a $C_{13}$ branched chain aliphatic saturated alcohol and hexadecenyl succinic acid.

4. A lubricating grease composition comprising a major amount of lubricating oil, about 2 to 25 weight percent of alkali metal salt of a half ester prepared from a $C_8$ to $C_{18}$ aliphatic saturated alcohol and a material selected from the group consisting of alkenyl succinic acid and alkenyl methyl succinic acid, wherein said alkenyl groups contain 8 to 22 carbon atoms; about 2 to 30 weight percent of alkali metal soap of a $C_{12}$ to $C_{30}$ fatty acid and about 1 to 10 weight percent of alkali metal salt of a $C_2$ to $C_4$ fatty acid; the total weight of said salts and said soap being about 5 to 40 weight percent of the grease composition, and wherein said salts and soap have been complexed by heating to 400° to 600° F.

5. A lubricating grease composition according to claim 4, wherein said oil is mineral lubricating oil, said alkali metal is sodium, said material is alkenyl succinic acid and said $C_2$ to $C_4$ fatty acid is acetic acid.

References Cited in the file of this patent

UNITED STATES PATENTS

| | | |
|---|---|---|
| 2,292,308 | Watkins | Aug. 4, 1942 |
| 2,294,259 | Van Peski et al. | Aug. 25, 1942 |
| 2,528,373 | Knowles et al. | Oct. 31, 1950 |
| 2,698,299 | Giammaria | Dec. 28, 1954 |
| 2,868,729 | Nelson et al. | Jan. 13, 1959 |

OTHER REFERENCES

The Condensed Chemical Dictionary, 5th ed., Reinhold Pub. Corp., N.Y. (1956), page 40.